United States Patent
Li Pi Shan et al.

(10) Patent No.: US 11,345,797 B2
(45) Date of Patent: May 31, 2022

(54) ETHYLENE/C5-C10 ALPHA-OLEFIN/ POLYENE INTERPOLYMERS

(71) Applicants: Dow Global Technologies LLC, Midland, MI (US); Rohm and Haas Company, Collegeville, PA (US)

(72) Inventors: Colin Li Pi Shan, Pearland, TX (US); Lixin Sun, Sugar Land, TX (US); Jeff F. Manganelli, Deer Park, TX (US); Timothy E. Clayfield, Cham (CH)

(73) Assignee: Dow Global Technologies LLC, Midland, MI (US)

( * ) Notice: Subject to any disclaimer, the term of this patent is extended or adjusted under 35 U.S.C. 154(b) by 160 days.

(21) Appl. No.: 16/639,681

(22) PCT Filed: Aug. 24, 2018

(86) PCT No.: PCT/US2018/047906
§ 371 (c)(1),
(2) Date: Feb. 17, 2020

(87) PCT Pub. No.: WO2019/040845
PCT Pub. Date: Feb. 28, 2019

(65) Prior Publication Data
US 2020/0239674 A1 Jul. 30, 2020

Related U.S. Application Data

(60) Provisional application No. 62/549,503, filed on Aug. 24, 2017.

(51) Int. Cl.
*C08L 49/00* (2006.01)
*C08L 23/08* (2006.01)

(52) U.S. Cl.
CPC .......... *C08L 23/0815* (2013.01); *C08L 49/00* (2013.01); *C08L 2205/025* (2013.01); *C08L 2312/00* (2013.01)

(58) Field of Classification Search
CPC ......... C08K 3/22; C08K 3/34; C08L 23/0815; C08F 210/18; C08F 4/64193
See application file for complete search history.

(56) References Cited

U.S. PATENT DOCUMENTS 5,286,798 A 2/1994 Davis et al.
5,521,263 A 5/1996 Seeger et al.
(Continued)

FOREIGN PATENT DOCUMENTS

EP 1433812 A1 6/2004
JP 2000026675 A * 1/2000
(Continued)

OTHER PUBLICATIONS

Williams and Ward, Polymer Letters, 1968, pp. 621-624, vol. 6.
(Continued)

*Primary Examiner* — Mark S Kaucher
(74) *Attorney, Agent, or Firm* — Cheney Huang

(57) ABSTRACT

A composition comprising an ethylene/C5-C10 alpha-olefin/ non-conjugated polyene interpolymer, wherein the interpolymer meets the following relationship: Tg (° C.)≤ [0.625(° C./wt %)XC−55° C.], where Tg is the glass transition temperature of the interpolymer, and XC is the wt % crystallinity of the interpolymer.

17 Claims, 2 Drawing Sheets

(56) References Cited

U.S. PATENT DOCUMENTS

| | | |
|---|---|---|
| 5,610,254 A | 3/1997 | Sagane et al. |
| 5,814,714 A | 9/1998 | Palomo et al. |
| 5,919,988 A | 7/1999 | Pazos et al. |
| 5,965,756 A | 10/1999 | McAdon et al. |
| 5,977,251 A * | 11/1999 | Kao .................... B01J 19/2435 525/53 |
| 6,034,022 A | 3/2000 | McAdon et al. |
| 6,045,922 A | 4/2000 | Janssen et al. |
| 6,225,427 B1 | 5/2001 | Burton et al. |
| 6,251,998 B1 | 6/2001 | Medsker et al. |
| 6,545,088 B1 | 4/2003 | Kolthammer et al. |
| 6,723,794 B2 | 4/2004 | Kawasaki et al. |
| 7,750,104 B2 | 7/2010 | Cady et al. |
| 8,178,031 B2 | 5/2012 | Jacob et al. |
| 8,299,189 B2 | 10/2012 | Boone et al. |
| 9,040,601 B2 | 5/2015 | Jacob |
| 9,040,605 B2 | 5/2015 | Deshpande et al. |
| 9,102,824 B2 | 8/2015 | Liang et al. |
| 9,120,887 B2 | 9/2015 | Voorheis et al. |
| 9,234,093 B2 | 1/2016 | Ellul et al. |
| 9,388,254 B2 | 7/2016 | Deshpande et al. |
| 9,422,383 B2 | 8/2016 | LiPiShan et al. |
| 10,072,146 B2 | 9/2018 | Wu et al. |
| 10,155,862 B2 | 12/2018 | Wu et al. |
| 10,160,819 B2 | 12/2018 | LiPiShan et al. |
| 10,160,841 B2 | 12/2018 | LiPiShan et al. |
| 10,676,601 B2 | 6/2020 | Hu et al. |
| 2002/0107328 A1* | 8/2002 | Laughner ................ C08L 23/10 525/240 |
| 2006/0183631 A1 | 8/2006 | Lee et al. |
| 2008/0033089 A1 | 2/2008 | Ellul et al. |
| 2008/0033124 A1 | 2/2008 | Jiang et al. |
| 2014/0364561 A1 | 12/2014 | Deshpande et al. |
| 2016/0060440 A1* | 3/2016 | Prieto .................... C08L 23/14 523/436 |

FOREIGN PATENT DOCUMENTS

| | | | |
|---|---|---|---|
| JP | 2004035813 A | 2/2004 | |
| WO | WO-0069930 A1 * | 11/2000 | ............ C08F 279/00 |
| WO | 2011/065877 A1 | 6/2011 | |

OTHER PUBLICATIONS

Fetters et al., Macromolecules, 1994, pp. 4639-4647, vol. 27, No. 17.
Fetters et al., Macromolecules, 1999, pp. 6847-6851, vol. 32.
PCT/US2018/047906, International Search Report and Written Opinion dated Nov. 9, 2018.
PCT/US2018/047906, International Preliminary Report on Patentability dated Feb. 25, 2020.

* cited by examiner

ETHYLENE/C5-C10 ALPHA-OLEFIN/POLYENE INTERPOLYMERS

REFERENCE TO RELATED APPLICATIONS

This application claims the benefit of priority to U.S. Provisional Application No. 62/549,503, filed on Aug. 24, 2017.

BACKGROUND OF THE INVENTION

EPDM is the preferred and most dominate hydrocarbon elastomer used in the manufacturing of cross-linked extruded profiles and molded goods. These articles are primarily used for automotive, infra-structure, and the general rubber industry. EPDM, with its diene functionality, allows for its use, for both sulfur and peroxide crosslinking, while POE's without the diene have use for peroxide crosslinking. Although saturated hydrocarbon rubbers are known for their easy processing, weathering stability and moisture resistance, rubber compounds formed from EPDM are limited in softness, pliability, and building tack. Other natural and synthetic rubbers, such as natural rubber, polyisoprene, polyisobutylene and polychloroprene, have unsaturated backbones that have a lower backbone moduli, and result in rubber compounds with better mechanical properties. Due to the soft nature of the rubber backbone, compounds made with such "soft rubbers" are suitable for use in the manufacturing of tires and belts.

Elastomer compositions are disclosed in the following: WO2011/008837, WO2012/092491, US20060183631, WO2011/163176, EP1433812A1, WO2011/041230, WO2006/009976, WO2000/26268, WO2013/096418, WO2017/044533, WO1996/011963, WO1996/37568, U.S. Pat. Nos. 9,388,254, 9,040,605, 8,178,031, EP751182A1, EP718324A1, WO2011/0065877, WO 2007/136494, JP04132672B2 (abstract), JP2004035813 (abstract), and EP1433812A1. However, there remains need for an ethylene-based elastomer, and compositions containing the same, with improved processability, and a lower modulus for building tack; through the combination of high molecular weight and a more flexible backbone, which is both sulfur and peroxide curable. This need is met by the following.

SUMMARY OF THE INVENTION

A composition comprising an ethylene/C5-C10 alpha-olefin/non-conjugated polyene interpolymer, wherein the interpolymer meets the following relationship: Tg (° C.)≤0.625(° C./wt %)XC−55° C., where Tg is the glass transition temperature of the interpolymer, and XC is the wt % crystallinity of the interpolymer.

A composition comprising a first composition that comprises a first ethylene/C5-C10 alpha-olefin/non-conjugated polyene interpolymer, and a second ethylene/C5-C10 alpha-olefin/non-conjugated polyene interpolymer; and wherein the first composition meets the following relationship: $Tg_{FC}$ (° C.)≤0.625(° C./wt %)$XC_{FC}$−55° C., where $Tg_{FC}$ is the glass transition temperature of the first composition, and $XC_{FC}$ is the wt % crystallinity of the first composition.

DETAILED DESCRIPTION OF THE INVENTION

Figure 1:
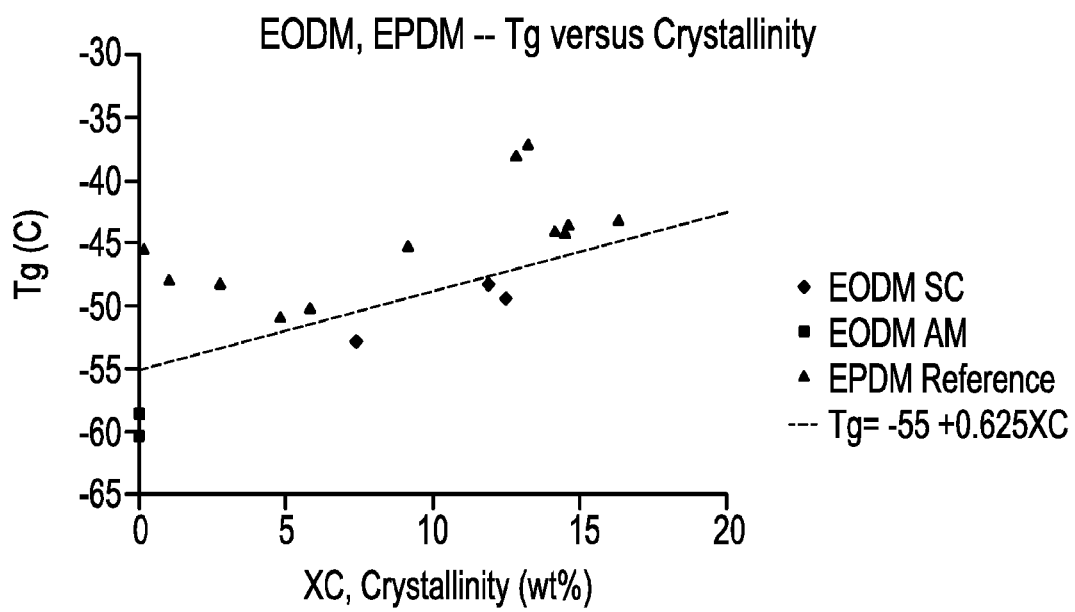
FIG. 1 is a plot of "Tg" versus "wt % crystallinity" for several inventive EODMs and comparative EPDMs.

Ethylene/alpha olefin/polyene interpolymers with a high content of higher alpha olefins (for example, C6, C8, C10 and above) and a diene (ENB, VNB, hexadiene) have been discovered. Also, it has been surprisingly discovered that the higher content of higher alpha olefin also increases its shear thinning characteristics (higher rheology ratio), and results in a polymer with lower Mooney viscosity, making it readily flowable and highly processable. Since a polymer's Mooney viscosity is shear rate dependent, the inventive polymers have significantly higher molecular weight than the respective EPDM polymers at the equivalent Mooney viscosity. Also, an amorphous ethylene/octene/ethylidene-norbornene interpolymer, with greater than 50 wt % of octene, results in a terpolymer with a lower modulus than its EPDM counterpart. This combination of higher molecular weight and lower modulus (due to a higher entanglement molecular weight) results in a polymer, and formulations containing the same, with lower modulus, better physical properties, and a wider temperature-use range.

In a first aspect, a composition is provided, comprising an ethylene/C5-C10 alpha-olefin/non-conjugated polyene interpolymer, wherein the interpolymer meets the following relationship: Tg (° C.)≤0.625(° C./wt %)XC−55° C., where Tg is the glass transition temperature of the interpolymer, and XC is the wt % crystallinity of the interpolymer.

In a second aspect, a composition is provided, comprising a first composition that comprises a first ethylene/C5-C10 alpha-olefin/non-conjugated polyene interpolymer, and a second ethylene/C5-C10 alpha-olefin/non-conjugated polyene interpolymer; and wherein the first composition meets the following relationship: $Tg_{FC}$ (° C.)≤0.625(° C./wt %)$XC_{FC}$−55° C., where $Tg_{FC}$ is the glass transition temperature of the first composition, and $XC_{FC}$ is the wt % crystallinity of the first composition.

The inventive composition may comprise a combination of two or more embodiments described herein.

The ethylene/C5-C10 alpha-olefin/nonconjugated polyene interpolymer may comprise a combination of two or more embodiments described herein. The first composition may comprise a combination of two or more embodiments described herein.

In one embodiment, in the first aspect, the ethylene/C5-C10 alpha-olefin/non-conjugated polyene interpolymer meets the following relationship: Mw (g/mol)≥1097.8[(g/mol)/MV]*MV+87939(g/mol), where Mw is the weight average molecular weight of the interpolymer, and MV is the Mooney Viscosity (ML1+4, 125° C.) of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/non-conjugated polyene interpolymer meets the following relationship: Mw (g/mol)≥1097.8[(g/mol)/MV]*MV+125000(g/mol), where Mw is the weight average molecular weight of the interpolymer, and MV is the Mooney Viscosity (ML1+4, 125° C.) of the interpolymer. In a further embodiment, the interpolymer is an ethylene/C5-C10 alpha-olefin/ diene terpolymer. In one embodiment, the diene is 5-ethylidene-2-norbornene (ENB). In one embodiment, the α-olefin is octene.

In one embodiment, the ethylene/C5-C10 alpha-olefin/non-conjugated polyene interpolymer meets the following relationship: Mw (g/mol)≥1097.8[(g/mol)/MV]*MV+165000(g/mol), where Mw is the weight average molecular weight of the interpolymer, and MV is the Mooney Viscosity (ML1+4, 125° C.) of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the α-olefin is octene.

In one embodiment, the ethylene/C5-C10 alpha-olefin/non-conjugated polyene interpolymer meets the following relationship: Mw (g/mol)≥1097.8[(g/mol)/MV]*MV+187500(g/mol), where Mw is the weight average molecular weight of the interpolymer, and MV is the Mooney Viscosity (ML1+4, 125° C.) of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the α-olefin is octene.

In one embodiment, the ethylene/C5-C10 alpha-olefin/non-conjugated polyene interpolymer meets the following relationship: Mw (g/mol)≥1097.8[(g/mol)/MV]*MV+210000(g/mol), where Mw is the weight average molecular weight of the interpolymer, and MV is the Mooney Viscosity (ML1+4, 125 C) of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the α-olefin is octene.

In one embodiment, the C5-C10 alpha-olefin of the ethylene/C5-C10 alpha-olefin/non-conjugated polyene interpolymer is a C6, C7 or C8 alpha-olefin, or a C6, or C8 alpha-olefin, or a C8 alpha-olefin. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/non-conjugated polyene interpolymer is an ethylene/octene/non-conjugated polyene interpolymer, and further an ethylene/octene/non-conjugated polyene terpolymer. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/non-conjugated polyene interpolymer comprises from 30 to 60 wt %, or from 31 to 58 wt %, or from 32 to 56 wt % polymerized alpha-olefin, based on the weight of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the α-olefin is octene.

In one embodiment, the ethylene/C5-C10 alpha-olefin/non-conjugated polyene interpolymer comprises from 35 to 70 wt %, or from 40 to 68 wt %, or from 42 to 66 wt %, or from 44 to 64 wt %, or from 46 to 62 wt % polymerized alpha-olefin, based on the weight of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/non-conjugated polyene interpolymer comprises from 42 to 65 wt %, or from 42 to 63 wt %, or from 42 to 60 wt %, or from 42 to 58 wt %, or from 42 to 56 wt %, or from 42 to 54 wt %, or from 42 to 52 wt %, or from 42 to 50 wt %, or from 42 to 48 wt % polymerized ethylene, based on the weight of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/non-conjugated polyene interpolymer comprises from 3.0 to 6.0 wt %, or from 3.5 to 5.8 wt %, or from 4.0 to 5.6 wt %, polymerized polyene, or polymerized diene, or polymerized ENB, based on the weight of the interpolymer. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the weight ratio of alpha-olefin to polyene, or alpha-olefin to diene, in the ethylene/C5-C10 alpha-olefin/non-conjugated polyene interpolymer, is from 6.4 to 14.0, or from 6.6 to 13.0, or from 6.8 to 12.5. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the weight ratio of alpha-olefin to ethylene, in the ethylene/C5-C10 alpha-olefin/non-conjugated polyene interpolymer, is from 1.00 to 1.50, or from 1.05 to 1.45, or from 1.10 to 1.40. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the first composition has a Mooney Viscosity≥20, or ≥25, or ≥30, or ≥35 (ML 1+4, 125° C.). In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has a Mooney Viscosity ≥40, or ≥45, or ≥50 (ML 1+4, 125° C.). In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer, has a Mooney Viscosity≤100, or ≤90, or ≤80 (ML 1+4, 125° C.). In a further embodiment, the interpolymer is an ethylene/C5-C10 alpha-olefin/diene terpolymer. In one embodiment, the diene is (ENB). In one embodiment, the alpha-olefin is octene.

Mooney viscosity is that of the neat interpolymer. The neat polymer refers to the polymer without filler and without oil. The polymer may be stabilized with "ppm amounts" of one or more antioxidants and/or other stabilizers.

In one embodiment, the ethylene/C5-C10 alpha-olefin/nonconjugated polyene interpolymer has a MWD≤6.0, or ≤5.5, or ≤5.0, or ≤4.5, or ≤4.0, or ≤3.5, or ≤3.0. In one embodiment, the first composition has a MWD≥2.0, or ≥2.2, or ≥2.4. In a further embodiment, the interpolymer is an EAODM terpolymer. In a further embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has a weight average molecular weight (Mw)≤650,000 g/mole, or ≤600,000 g/mole, or ≤550,000 g/mole, or ≤500,000 g/mole. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has a weight average molecular weight (Mw)≥100,000 g/mole, or ≥110,000 g/mole, or ≥120,000 g/mole, or ≥140,000 g/mole. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer, has a viscosity at 0.1 rad/sec, 190° C., ≥15,000 Pa·s, or ≥20,000 Pa·s, or ≥25,000 Pa·s. In a further embodiment, the interpolymer is an ethylene/C5-C10 alpha-olefin/diene terpolymer. In one embodiment, the diene is (ENB). In one embodiment, the alpha-olefin is octene.

In one embodiment, the ethylene/C5-C10 alpha-olefin/nonconjugated polyene interpolymer, has a viscosity at 0.1 rad/sec, 190° C., ≤300,000 Pa·s, or ≤280,000 Pa·s, or ≤250,000 Pa·s, or ≤200,000 Pa·s. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has a rheology ratio (V0.1/V100 at 190° C.)≥20, or ≥23, or ≥25, or ≥30, or ≥40, or ≥50. In one embodiment, the ethylene/C5-C10 alpha-olefin/nonconjugated polyene interpolymer has a rheology ratio (V0.1/V100 at 190° C.)≤170, or ≤160, or ≤150. In a further embodiment, the interpolymer is an ethylene/C5-C10 alpha-olefin/diene terpolymer. In one embodiment, the diene is (ENB). In one embodiment, the α-olefin is octene.

In one embodiment, the ethylene/C5-C10 alpha-olefin/nonconjugated polyene interpolymer has a rheology ratio (V0.1/V100 at 190° C.) from 20 to 80, or from 30 to 70, or from 40 to 60. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

The rheology ratio (V0.1/V100 at 190° C.), the V0.1 at 190° C. and the V100 at 190° C. of the ethylene/C5-C10 α-olefin/-nonconjugated polyene interpolymer is that of the neat polymer (no oil, no filler). The polymer may be stabilized with "ppm amounts" of one or more antioxidants and/or other stabilizers.

In one embodiment, the ethylene/C5-C10 alpha-olefin/nonconjugated polyene interpolymer has a crystallinity (XC, wt %) from 0 to 25 wt %, or from 0 to 20 wt %, or from 0 to 15 wt %, or from 0 to 10 wt %. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has a crystallinity (XC, wt %) from 5 to 25 wt %, or from 5 to 20 wt %, or from 5 to 15 wt %. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has a glass transition temperature (Tg) from −70° C. to −40° C., or from −66° C. to −42° C., or from −64° C. to −44° C., or from −62° C. to −46° C. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has a melting temperature (Tm) from 0° C. to 50° C., or from 0° C. to 48° C. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has a melting temperature (Tm) from 30° C. to 50° C., or from 32° C. to 48° C. Further, the interpolymer is an ethylene/C5-C10 α-olefin/diene terpolymer. In one embodiment, the diene is (ENB). In one embodiment, the α-olefin is octene.

In one embodiment, the ethylene/C5-C10 alpha-olefin/nonconjugated polyene interpolymer has a crystallization temperature (Tc) from 0° C. to 30° C., or from 0° C. to 28° C. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has a crystallization temperature (Tc) from 5° C. to 30° C., or from 6° C. to 28° C. Further, the interpolymer is an ethylene/C5-C10 alpha-olefin/diene terpolymer. In one embodiment, the diene is ENB. In one embodiment, the alpha-olefin is octene.

In one embodiment, the ethylene/C5-C10 alpha-olefin/nonconjugated polyene interpolymer has a density from 0.860 to 0.880 g/cc, or from 0.860 to 0.875 g/cc, or from 0.860 to 0.870 g/cc (1 cc=1 cm3). In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has a density≤0.855 g/cc, or ≤0.850 g/cc (1 cc=1 cm3). In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 alpha-olefin/nonconjugated polyene interpolymer has an E'0.5 (Pa) value from 500,000 Pa to 1,200,000 Pa, or from 600,000 Pa to 1,100,000 Pa. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene. In one embodiment, the ethylene/C5-C10 alpha-olefin/nonconjugated polyene interpolymer has an E'500/E'0.5 ratio from 0.80 to 1.40, or from 0.90 to 1.30. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the composition comprises ≥90 wt %, or ≥95 wt %, or ≥98 wt %, or ≥99 wt %, of the ethylene/C5-C10 alpha-olefin/nonconjugated polyene interpolymer, based on the weight of the composition. In a further embodiment, the interpolymer is an ethylene/C5-C10 alpha-olefin/ diene terpolymer. In one embodiment, the diene is 5-ethylidene-2-norbornene (ENB). In one embodiment, the alpha-olefin is octene.

In one embodiment, the composition comprises ≥20 wt %, or ≥30 wt %, or ≥40 wt %, or ≥50 wt % of the ethylene/C5-C10 alpha-olefin/nonconjugated polyene interpolymer, based on the weight of the composition. In a further embodiment, the interpolymer is an ethylene/C5-C10 alpha-olefin/diene terpolymer. In one embodiment, the diene is 5-ethylidene-2-norbornene (ENB). In one embodiment, the alpha-olefin is octene.

In one embodiment, the ethylene/C5-C10 α-olefin/nonconjugated polyene interpolymer is an ethylene/C5-C10 α-olefin/diene interpolymer (EAODM). Further, the diene is ENB.

The composition may comprise a combination of two or more embodiments described herein. The ethylene/C5-C10alpha-olefin/nonconjugated polyene interpolymer may comprise a combination of two or more embodiments described herein. The ethylene/C5-C10 α-olefin/nonconjugated polyene interpolymer, further an EAODM, and further an EPDM, may comprise a combination of two or more embodiments as described herein.

In one embodiment, the composition further comprises a second an ethylene/C5-C10 alpha-olefin/non-conjugated polyene interpolymer, which differs from the interpolymer in one or more of the following properties: Mw, Mn, MWD, Tg and/or MV (ML 1+4, 125° C.). In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, the composition comprises ≥90 wt %, or ≥95 wt %, or ≥98 wt %, of the sum weight of the ethylene/C5-C10 alpha-olefin/nonconjugated polyene interpolymer and the second ethylene/C5-C10 alpha-olefin/nonconjugated polyene interpolymer, based on the weight of the composition. In one embodiment, the composition comprises ≥30 wt %, or ≥40 wt %, or ≥50 wt %, of the sum weight of the ethylene/alpha-olefin/nonconjugated polyene interpolymer and the second ethylene/alpha-olefin/nonconjugated polyene interpolymer, based on the weight of the composition.

In the second aspect, the second ethylene/C5-C10 alpha-olefin/non-conjugated polyene interpolymer, which differs from the first interpolymer in one or more of the following properties: Mw, Mn, MWD, Tg and/or MV (ML 1+4, 125° C.). In a further embodiment, each interpolymer is an ethylene/C5-C10 alpha-olefin/diene terpolymer. In one embodiment, each diene ENB. In one embodiment, each alpha-olefin is octene.

In one embodiment, in the second aspect, the first composition meets the following relationship: $Mw_{FC}$ (g/mol)≥1097.8[(g/mol)/MV]*$MV_{FC}$+87939(g/mol), where $Mw_{FC}$ is the weight average molecular weight of the first composition, and $MV_{FC}$ is the Mooney Viscosity (ML1+4, 125° C.) of the first composition. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, the first composition meets the following relationship: $Mw_{FC}$ (g/mol)≥1097.8[(g/mol)/MV]*$MV_{FC}$+125000(g/mol), where $Mw_{FC}$ is the weight average molecular weight of the interpolymer, and $MV_{FC}$ is the Mooney Viscosity (ML1+4, 125° C.) of the interpolymer. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, the first composition meets the following relationship: $Mw_{FC}$ (g/mol)≥1097.8[(g/mol)/MV]*$MV_{FC}$+165000(g/mol), where $Mw_{FC}$ is the weight average molecular weight of the interpolymer, and $MV_{FC}$ is the Mooney Viscosity (ML1+4, 125° C.) of the interpolymer. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, the first composition meets the following relationship: $Mw_{FC}$ (g/mol)≥1097.8[(g/mol)/MV]*$MV_{FC}$+187500(g/mol), where $Mw_{FC}$ is the weight average molecular weight of the interpolymer, and $MV_{FC}$ is the Mooney Viscosity (ML1+4, 125° C.) of the interpolymer. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, the first composition meets the following relationship: $Mw_{FC}$ (g/mol)≥1097.8[(g/mol)/MV]*$MV_{FC}$+210000(g/mol), where $Mw_{FC}$ is the weight average molecular weight of the interpolymer, and $MV_{FC}$ is the Mooney Viscosity (ML1+4, 125° C.) of the interpolymer. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, each C5-C10 alpha-olefin of the ethylene/C5-C10 alpha-olefin/non-conjugated polyene interpolymer is a C6, C7 or C8 alpha-olefin, or a C6, or C8 alpha-olefin, or a C8 alpha-olefin. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

In one embodiment, each ethylene/C5-C10 alpha-olefin/non-conjugated polyene interpolymer is an ethylene/octene/non-conjugated polyene interpolymer, and further an ethylene/octene/diene terpolymer. In one embodiment, each diene is 5-ethylidene-2-norbornene (ENB). In one embodiment, each alpha-olefin is octene.

In one embodiment, the first composition further comprises ≥90 wt %, or ≥95 wt %, or ≥98 wt %, or ≥99 wt %, of the sum weight of the first ethylene/C5-C10 alpha-olefin/non-conjugated polyene interpolymer and the second ethylene/C5-C10 alpha-olefin/nonconjugated polyene inter-polymer, based on the weight of the first composition. In a further embodiment, each interpolymer is an ethylene/C5-C10 alpha-olefin/diene terpolymer. In one embodiment, each diene is ENB. In one embodiment, each alpha-olefin is octene.

In one embodiment, the composition further comprises ≥90 wt %, or ≥95 wt %, or ≥98 wt %, or ≥99 wt %, of the first composition, based on the weight of the composition. In a further embodiment, each interpolymer is an ethylene/C5-C10 alpha-olefin/diene terpolymer. In one embodiment, each diene is 5-ethylidene-2-norbornene (ENB). In one embodiment, each alpha-olefin is octene.

The following embodiments apply to both the first aspect and second aspect of the invention.

In one embodiment, the composition further comprises a crosslinking agent. In one embodiment, the composition further comprises an oil. In one embodiment, an inventive composition further comprises a filler. Suitable fillers include, but are not limited to, clay, CaCO3, talc, carbon black, and mineral fibers. In one embodiment, the filler is present in an amount from 5 to 30 weight percent, based on the weight of the composition. In one embodiment, an inventive composition further comprises at least one stabilizer. Suitable stabilizers include, but are not limited to, AO and UV stabilizers.

Also provided is a crosslinked composition formed from the composition of any one of the previous claims.

Also provided is an article comprising at least one component formed from a composition of one or more embodiments described herein. In a further embodiment, the article is selected from the group consisting of profiles, injection molded parts, gaskets, automotive parts, building and construction materials, shoe components, and tubes. In one embodiment, the article is an automotive part.

The inventive composition may comprise a combination of two or more embodiments described herein. An inventive article may comprise a combination of two or more embodiments described herein.

Ethylene/C5-C10 α-Olefin/Nonconjugated Polyenes Interpolymers

Each ethylene/C5-C10 α-olefin/nonconjugated polyene interpolymer (including the second ethylene/α-olefin/nonconjugated polyene interpolymer), for the inventive compositions described herein, comprise, in polymerize form, ethylene, a C5-C10 α-olefin, and a nonconjugated polyene. Examples of the polyenes include the C4-C40 nonconjugated dienes. Preferred C5-C10 aliphatic α-olefins are selected from the group consisting of 1-pentene, 1-hexene, 1-heptent and 1-octene, or 1-hexane and 1-octene, or 1-octene.

In one embodiment, the diene is 5-ethylidene-2-norbornene (ENB). Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and more preferably ENB.

In one embodiment, each ethylene/C5-C10 α-olefin/nonconjugated polyene interpolymer comprises a majority amount of polymerized ethylene, based on the weight of the interpolymer. In a further embodiment, each ethylene/C5-C10α-olefin/nonconjugated polyene interpolymer is an ethylene/C5-C10 α-olefin/dene interpolymer. In a further embodiment, each interpolymer is an ethylene/C5-C10 α-olefin/dene terpolymer. In a further embodiment, the diene is ENB.

An ethylene/C5-C10 alpha-olefin/nonconjugated polyene interpolymer may comprise a combination of two or more embodiments as described herein. An ethylene/C5-C10 alpha-olefin/diene interpolymer may comprise a combination of two or more embodiments as described herein. An ethylene/C5-C10 alpha-olefin/diene terpolymer may comprise a combination of two or more embodiments as described herein.

Crosslinking Agents and Oils

Vulcanizing agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art. Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

In one embodiment of the invention, the sulfur containing compounds and the peroxides are the preferred vulcanizing agents, and the sulfur containing compounds are most preferred. It is understood that mixtures of these vulcanizing agents can be employed, though this is generally not preferred. The amount of the vulcanizing agent can range from about 1 to 10 parts by weight, based upon 100 parts of the polymers in the composition. Vulcanization temperatures and time employed are typical. Temperatures ranging from about 250° F. to about 440° F., and times from about one minute to about 120 minutes can be employed.

Additional crosslinking agents include, but are not limited to, phenolic resins, azides, aldehyde-amine reaction products, vinyl silanes, hydrosilylation, substituted ureas, substituted guanidines; substituted xanthates; substituted dithiocarbamates; and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970), which are incorporated by reference herein in their entirety.

The crosslinking agent may be a phenolic curing agent or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"), for silane-grafted interpolymer. A phenolic resin and SnCl2 is used for EPDM curing (peroxide, or sulfur or hydrosilation curing systems can also be used). Suitable peroxides include, but are not limited to, aromatic dactyl peroxides; aliphatic dactyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butyl-perbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide; and the like. The vulcanizing elastomer may be grafted to a vinyl silane monomer in the presence of a low level of peroxide via a separate reactive extrusion process. Suitable vinyl silanes include, but are not limited to, vinyl trimethoxysilane, vinyl triethoxysilane. The grafted elastomer may then be reacted with water to cure the polymer in the presence of a catalyst such as dibutyl tin dilaurate during the dynamic vulcanization process. Suitable water sources include, but are not limited to, steam, water/ethylene glycol mixtures, aluminum trihydrate, and magnesium hydroxide. Either ethylene-alpha-olefin copolymers or ethylene-alpha-olefin-polyene terpolymers are suitable vulcanizing elastomers for this cure system.

Silicon hydride having at least two SiH groups in the molecule may be reacted with the carbon-carbon multiple bonds of the unsaturated rubber component in the presence of a hydrosilylation catalyst to form useful crosslinks during dynamic vulcanization. Suitable silicon hydride compounds include, but are not limited to, methylhydrogen polysiloxanes, methylhydrogen dimethyl-siloxane copolymers, methylhydrogen alkyl methyl polysiloxanes, bis(dimethylsilyl)alkanes and bis(dimethylsilyl)benzene. The amount of silicon hydride compound useful in the process of the composition can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer. Suitable catalysts for the hydrosilylation vulcanization reaction include transition metals of Group VIII such as palladium, rhodium, platinum and the like, including complexes of these metals. The use of hydrosilylation crosslinking to dynamically vulcanize EPDM to produce TPV's was disclosed in U.S. Pat. No. 6,251,998 (Medsker, et al., Jun. 26, 2001), which is incorporated by reference herein in its entirety. A crosslinking agent may comprise a combination of two or more embodiments as described herein.

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like. In one embodiment, the oil is present in an amount from 5 to 70 weight percent, further from 5 to 60 weight percent, further from 5 to 50 weight percent, based on the weight of the composition. In one embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550.

Additives and Applications

An inventive composition may comprise one or more additional additives. Suitable additives include, but are not limited to, fillers, antioxidants and antiozonants, UV stabilizers, flame retardants, colorants or pigments, and combinations thereof. Fillers include, but are not limited to, carbon black, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like. Some antioxidants and antiozonants include, but are not limited to, hindered phenols, bisphenols, and thiobisphenols; and substituted hydroquinones. Foaming agents, such as azodicarbon-amide, can be used for making a foam structure.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers.

The compositions of the present invention may be used to prepare a variety of articles or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes. Articles include, but are not limited to, sheets, foams, molded goods, and extruded parts. Additional articles include automotive parts, including tires and hoses, weather strips, belts, hoses, building profiles, wire and cable jacketing, flooring materials, gaskets, tires and tire components, computer parts, building materials and footwear components. A skilled artisan can readily augment this list without undue experimentation.

DEFINITIONS

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer. The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority wt % of the α-olefin (based on the weight of the interpolymer). Note "α-olefin" is also noted as "alpha-olefin." The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority wt % of the α-olefin (based on the weight of the interpolymer).

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

TEST METHODS

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4-trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 micro-liters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})B$, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using VISCOTEK TriSEC software Version 3.0.

13C NMR Method for EODM Composition Analysis

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points. NMR spectral analysis of each composition of the examples was carried out using the following analysis method. Quantitation of monomers present in EPDM can be calculated using the following equations (1 through 9).

The calculation of moles ethylene normalizes the spectral range from 55.0 to 5.0 ppm to 1000 integral units. The contribution under the normalized integral area only accounts for 7 of the ENB carbons. SC66 is carbon #6 (counting from the methyls) of the 6 carbons side chain form octene, $$\text{Moles } Eth = \frac{[1000 - (8^* \text{ moles } O) - 7^* \text{ moles } ENB]}{2} \quad \text{Equation 1}$$

$$\text{Moles } ENB = \frac{ENB \text{ Diene peaks at 146-148 and 110-112 ppm} + ENB \text{ CH3s at 14.4 and 13.8}}{3} \quad \text{Equation 2}$$

$$\text{Moles } O = \frac{[\text{branch } CHs \text{ at 38.2 and 35.9 ppm} + ((\text{alphas and } SC66 \text{ at 34-35.5 ppm})/3)]}{2} \quad \text{Equation 3}$$

$$\text{Mole \% ethylene} = \frac{100^* \text{ molesE}}{\text{molesE} + \text{molesO} + \text{moles ENB}} \quad \text{Equation 4}$$

$$\text{Mole \% octene} = \frac{100^* \text{ molesO}}{\text{molesE} + \text{molesO} + \text{moles ENB}} \quad \text{Equation 5}$$

$$\text{Mole \% ENB} = \frac{100^* \text{ molesENB}}{\text{molesE} + \text{molesO} + \text{moles ENB}} \quad \text{Equation 6}$$

$$\text{Wt \% ethylene} = \frac{100^* \text{ mole \% } E \; ^* \; 28}{\text{Mole \% } E \; ^*28 + \text{mole \% } O^* \; 112 + \text{mole \% } ENB \; ^*120} \quad \text{Equation 7}$$

$$\text{Wt \% octene} = \frac{100^* \text{ mole \% } O \; ^* \; 112}{\text{Mole \% } E \; ^*28 + \text{mole \% } O^* \; 112 + \text{mole \% } ENB \; ^*120} \quad \text{Equation 8}$$

$$\text{Wt \% ENB} = \frac{100^* \text{ mole \% } ENB \; ^* \; 120}{\text{Mole \% } E \; ^*28 + \text{mole \% } O^* \; 112 + \text{mole \% } ENB \; ^*120} \quad \text{Equation 9}$$

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR") was recorded. A linear molecule (no detectable long chain branching) typically has a RR of 8 or less.

Differential Scanning Calorimetry (DSC)

Differential Scanning calorimetry (DSC) is used to measure crystallinity in ethylene-based (PE) samples (including EPDM) and propylene-based (PP) samples. Sample (0.5 g) sample was compression molded into a film, at 5000 psi, 190° C., for two minutes. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −90° C. for PE (−90° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (for example, % cryst.=(Hf/292 J/g)×100 (for PE)). Unless otherwise stated, melting point(s) (Tm) of each polymer is determined from the second heat curve, and the crystallization temperature (Tc) is determined from the first cooling curve. The DSC melting peak is measured as the maximum in heat flow (W/g) with respect to the linear baseline drawn between −35° C. and the end of melting. The heat of fusion is measured as the area under the melting curve between −35° C. and the end of melting using a linear baseline. The glass transition temperature (Tg) of each polymer is determined from the second heat curve, and is taken as the inflection point in the curve measured at the half height of the inflection.

Mooney Viscosity

Mooney Viscosity (ML1+4 at 125° C. or 100° C.) was measured in accordance with ASTM 1646, with a one minute preheat time and a four minute rotor operation time. The instrument is an Alpha Technologies Mooney Viscometer 2000. The viscosity of each formulated compositions was measured using an uncured blanket (see experimental section), so that the viscosity of the uncured composition could be examined. Samples were conditioned for 24 hours at room temperature, prior to testing.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. t5 is a "five Mooney unit" increase in viscosity). The total test time was 30 minutes, with a 1 minute preheat time. The viscosity of the compositions were measured from uncured blanket, cured in the viscometer, so that the scorch properties could be examined. Samples were conditioned for 24 hours at room temperature, prior to testing.

MDR Analysis

MDR cure properties of each formulation were measured in accordance to ASTM D-3182, using an Alpha Technologies Rheometer MDR 2000. The MDR Test was carried out at 160° C. over a period of 30 minutes. The rheology of each formulated composition was measured from samples of uncured blanket, which was then cured during the MDR analysis. Samples were conditioned for 24 hours at room temperature, prior to testing. The visco-elastic properties, such as Mooney low, Mooney high, tan delta low, tan delta high, and time to reach a certain percentage of the cure state (for example, t95 corresponds to the time in minutes to reach the 95% state of cure), were measured during the cure cycle.

Mixing of Rubber Compositions

Each rubber formulation was shear mixed in a BANBURY mixer (starting from room temperature), and then milled into flat blankets using a roll-mill.

The formulation was mixed using a Farrel BR Banbury Mixer (1.5 L volume) using an upside down mixing method. The polymer was weighed in, with the sulfur and other dry ingredients, and fluxed at a slow-speed for 2.5 minutes, at 66° C. (150° F.), the accelerator was added, and then the mixture was further fluxed, and then dropped at 110° C. (230° F.). A 6" Reliable Roll Mill was then used complete the mixing, and to mill an uncured blanket of the desired composition.

Compression Molded Plaques Preparation for Property Testing

The physical properties of the compositions were measured from plaques, cured in a compression molder (for tensile, compression set testing). The samples were compression molded in accordance to ASTM D3182 using a PHI (100 ton press).

The desired mold (6"×6" plaque or compression buttons) was in platen. Each Sample (uncured blanket) was cut slightly smaller than the dimensions of the individual mold cavity. The mill direction was marked, and the sample was labeled. Spray brush lightly with a dilute solution of silicone and apply to mold. Samples were placed in the preheated mold, taking care to place properly for mill direction. The platens were closed. The "normal" operating pressure was 100 tons, or as shown on the gauge as 200,000 pounds. When the cure time ended, the bottom platen was automatically open. The samples were removed, and immediately place in the water to stop curing. Samples were conditioned for 24 hours at room temperature, prior to testing. To vulcanize the samples, samples were conditioned at 200° C., using t95 data plus three minutes for plaques, and t95 data plus 15 minutes for compression set buttons.

Compression Set

Compression set was measured according to ASTM D395 at 23° C. and 100° C. Disks of 29 mm (±0.5 mm) in diameter and 12.7 mm (±0.5 mm) thickness, were punched from compression molded plaques, prepared as described under the section for compression molding. Each button sample was inspected for notches, uneven thickness and inhomogeneity, and selected buttons (without those defects) were tested. Compression set was performed on two specimens for each sample, at the temperatures specified, and the average results of the two specimens was reported. The button sample was placed in the compression device having two metal plates that could be pressed together, and locked into place at 75% of the original height of the button sample. The compression device, with the compressed samples, was then placed in an oven, and equilibrated at the appropriate temperature for a specified time (22 hrs for 23° C. or 100° C.). In this test, the stress was released at the test temperature, and the thickness of the sample was measured after a 30 minute equilibration period at room temperature. Compression set is a measured of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Tensile Stress-Strain Properties

Tensile properties were measured using specimens which were die cut, using a small "dog bone" shaped micro tensile die, having the dimensions described in ASTM D-1708. The die cut specimens were cut from the compression molded plaques, which were prepared as described under the Compression Molding section. Tensile properties (tensile strength and elongation) were measured at room temperature, following the method ASTM D-412, in the machine direction of an INSTRON MODEL 1122, made by INSTRU-MET.

Shore A Hardness

Sample specimens were cut from compression molded plaques, which were prepared as described in the compression molding section. Shore A hardness was measured per ASTM D2240, on a Shore A Durometer Model 2000, made by INSTRON, with a Durometer Stand Model 902. This method permits hardness measurements, based on either initial indentation, or indentation after a specific period of time, or both. As used herein, the indentation was measured at a specified time of ten seconds.

Temperature Retraction

The temperature retraction properties of the cured specimens were measured in accordance to ASTM D-1329. Retraction at Lower Temperatures using MODEL #TR-6 (BENZ Materials). This test method describes a temperature-retraction procedure for rapid evaluation of crystallization effects and for comparing visco-elastic properties of rubber and rubber-like materials at low temperatures. The initial specimen had dimensions of "48 mm by 120 mm by 2 mm," and was die cut according to the shape described in ASTM D-1329. This test method was carried out by elongating the specimen to 150%, locking specimen in the elongated condition, freezing specimen to a state of reduced elasticity ($-45°$ C.), equilibrating the specimen for ten minutes, releasing the frozen specimen, and allowing specimen to retract freely, while raising the temperature at 1° C./min, measuring the length of the specimen at regular temperature intervals, while it is retracting, and computing the percentage retraction at these temperatures from the data obtained. In practice, the temperatures corresponding to 10% and 70% retraction are of particular importance, and are designated as TR10 and TR70, respectively.

C-Tear Testing

C-Tear properties were measured using specimens which were die cut, using a die, having the dimensions described in ASTM D-624. The die cut specimens were cut from the cured and compression molded plaques, which were prepared as described under the Compression Molding section. The specimens were conditioned at ASTM conditions (23+/$-2°$ C. and 50% RH) for at least 16 hours, before they were died out and tested. Tear properties were measured, at room temperature, following the method ASTM D-624, and were measured in the mill direction using an INSTRON MODEL 1122, made by INSTRU-MET. The gauge length between the grips was set to be 50.8 mm, and the testing speed was carried out at 508 mm/min. The average C tear strength was reported in N/mm.

Low Temperature Brittleness Testing

The low temperature brittleness failure of the rubber specimens are measured in accordance with ASTM D2137 using Method A. Compression molded plaques, prepared as described under the section for compression molding, and rectangular shaped test samples were punched out of the molded plaque. Five rectangular specimens (6.4±0.3 mm) are tested beginning at a temperature of $-60°$ C., and then by increments of 10° C. The heat transfer fluid is PMX 200 Silicone Fluid 5 available from Dow Corning.

Hot Air Aging

The hot air aging test is carried out at 180° C. The specimens were subjected to air ventilated oven at 180° C./96 hrs (4 days). Tensile elongation to break are measured at room temperature, following the method ASTM D412.

Low Temperature Compression Recovery

Low temperature creep recovery measurement is performed using a TA Instruments ARES G2, equipped with 8 mm parallel plates, operated in compression mode. The specimen thickness is 2 mm that is prepared by compression molding. The experiments are performed at $-25°$ C. and $-35°$ C. with a 1N force on the plate (20000 Pa total stress). The normal force was applied for 1200 s and then the sample was allowed to recovery for additional 1200 s. The percent recovery is measured as the ratio of the gap between the plates before and after the force is removed.

EXPERIMENTAL

A) Representative Polymerization of Experimental EODMs—Continuous Polymerization Continuous solution polymerizations are carried out in a computer controlled autoclave reactor equipped with an internal stirrer (see, for example, U.S. Pat. Nos. 5,977,251 and 6,545,088). Purified mixed alkanes solvent (ISOPAR E available from ExxonMobil Chemical Company), ethylene, octene, 5-ethylidene-2-norbornene, and hydrogen (where used) were supplied to a 3.8 L reactor, equipped with a jacket for temperature control and an internal thermocouple. The solvent feed to the reactor was measured by a mass-flow controller. A variable speed diaphragm pump controlled the solvent flow rate and pressure to the reactor. At the discharge of the pump, a side stream was taken to provide flush flows for the catalyst and cocatalyst injection lines, and the reactor agitator. These flows were measured by Micro-Motion mass flow meters, and controlled by control valves or by the manual adjustment of needle valves. The remaining solvent was combined with octene, ethylene, 5-ethylidene-2-norbornene, and hydrogen (where used) and fed to the reactor. A mass flow controller was used to deliver hydrogen to the reactor as needed.

The temperature of the solvent/monomer solution was controlled by use of a heat exchanger before entering the reactor. This stream entered the bottom of the reactor. The catalyst component solutions were metered using pumps and mass flow meters, and were combined with the catalyst flush solvent, and introduced into the bottom of the reactor. The reactor was run liquid-full at 500 psig (3.45 MPa), with vigorous stirring. Product was removed through exit lines at the top of the reactor. All exit lines from the reactor were steam traced and insulated. Polymerization was stopped by the addition of a small amount of water into the exit line, along with any stabilizers, or other additives, and passing the mixture through a static mixer. The product stream was then heated by passing through a heat exchanger before devolatilization. The polymer product was recovered by extrusion using a devolatilizing extruder and water cooled pelletizer. See Tables 1A-1D.

Catalyst 1 {[[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl} was fed to the reactor separately, and activated in-situ using co-catalyst 1 and co-catalyst 2. Cocatalyst-1 was a mixture of methyldi($C_{14-18}$ alkyl)ammonium salts of tetrakis(pentafluorophenyl)borate, prepared by reaction of a long chain trialkylamine (ARMEEN M2HT, available from Akzo-Nobel, Inc.), HCl and Li[B(C$_6$F$_5$)$_4$], substantially as disclosed in U.S. Pat. No. 5,919,988 (Ex. 2). Cocatalyst-1 was purchased from Boulder Scientific, and used without further purification. Cocatalyst-2 (modified methylalumoxane (MMAO)) was purchased from Akzo Nobel, and used without further purification. The outlet stream of the reactor was consequently a mixture of polymer, solvent, and reduced levels of the initial monomer streams. The molecular weight of the polymer was controlled by adjusting reactor temperature, monomer conversion, and/or the addition of a chain terminating agent, such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase. A series of ethylene-octene-ENB terpolymers, listed in Tables 1A-1D, were produced. Two series of polymers were targeted and synthesized; amorphous EODM polymers with 50 wt % octene and 5% ENB, and semi-crystalline EODM polymers with 35 wt % octene and 5% ENB; each series at about 20, 45, and 100 Mooney Viscosities.

TABLE 1A

Reaction Conditions for Experimental EODM

| Ex. | Reactor Volume, [gal] | Reactor Temp. [deg C.] | Pressure [psig] | Solvent Feed [lb/hr] | Ethylene Feed [lb/hr] | Octene Feed [lb/hr] | ENB Feed [lb/hr] |
|---|---|---|---|---|---|---|---|
| EODM 1 | 1 | 180.0 | 525.1 | 25.3 | 2.61 | 2.82 | 0.295 |
| EODM 2 | 1 | 140.0 | 525.0 | 25.3 | 2.62 | 2.52 | 0.276 |
| EODM 3 | 1 | 80.4 | 524.7 | 33.8 | 2.13 | 2.31 | 0.245 |

TABLE 1B

Reaction Conditions for Experimental EODM

| Ex. | H2 Mol % | C2 Concen. [g/L] | Catalyst Efficiency [lb_poly/lb_metal] *10E6 | Catalyst Flow [lb/hr] | Catalyst Solution Conc. (ppm) | Cocat-1 Flow [lb/hr] | Cocat-1 Solution Conc. (ppm) | Cocat-2 Flow [lb/hr] | Cocat-2 Solution Conc. [ppm] | Production Rate [lb/hr] |
|---|---|---|---|---|---|---|---|---|---|---|
| EODM 1 | 0.053 | 2.86 | 0.859 | 0.244 | 23.8 | 0.275 | 169.0 | 0.197 | 44.0 | 4.98 |
| EODM 2 | 0.189 | 2.91 | 1.75 | 0.109 | 23.8 | 0.124 | 169.0 | 0.088 | 44.0 | 4.51 |
| EODM 3 | 0.062 | 6.99 | 2.19 | 0.154 | 10.9 | 0.293 | 169.0 | 0.214 | 44.0 | 3.65 |

TABLE 1C

Reaction Conditions for Experimental EODM

| Ex. | Reactor Volume, [gal] | Reactor Temp. [deg C.] | Pressure [psig] | Solvent Feed [lb/hr] | Ethylene Feed [lb/hr] | Octene Feed [lb/hr] | ENB Feed [lb/hr] |
|---|---|---|---|---|---|---|---|
| EODM 4 | 1 | 144.9 | 525.2 | 25.3 | 2.11 | 7.46 | 0.419 |
| EODM 5 | 1 | 119.9 | 525.2 | 25.2 | 1.42 | 5.01 | 0.419 |
| EODM 6 | 1 | 100.0 | 525.3 | 25.2 | 1.20 | 4.21 | 0.411 |

TABLE 1D

Reaction Conditions for Experimental EODM

| Ex. | H2 Mol % | C2 Concen. [g/L] | Catalyst Efficiency [lb_poly/lb_metal] *10E6 | Catalyst Flow [lb/hr] | Catalyst Solution Conc. (ppm) | Cocat-1 Flow [lb/hr] | Cocat-1 Solution Conc. (ppm) | Cocat-2 Flow [lb/hr] | Cocat-2 Solution Conc. [ppm] | Production Rate [lb/hr] |
|---|---|---|---|---|---|---|---|---|---|---|
| EODM 4 | 0.0253 | 3.30 | 2.28 | 0.173 | 23.8 | 0.199 | 169.0 | 0.144 | 44.0 | 9.37 |
| EODM 5 | 0.0139 | 3.04 | 1.07 | 0.232 | 23.8 | 0.264 | 169.0 | 0.189 | 44.0 | 5.93 |
| EODM 6 | 0.0278 | 5.31 | 1.14 | 0.177 | 23.8 | 0.200 | 169.0 | 0.145 | 44.0 | 4.80 |

Properties of the EODMs (first compositions) are shown in Tables 2-5. Mooney Visc. and 13C NMR results are shown in Table 2. Table 3 summarizes the analytical properties (DMS frequency-sweep rheology @190° C., DSC, and GPC) of the EODM materials. Table 4 summarizes the unique Tg and Mw relationships. Table 5 shows higher dampening and a flatter E' modulus response to changes in frequency for the inventive EODMs, which make theses polymers suitable for tire applications. Table 6 and Table 7 summarize the composition and analytical properties of comparative NORDEL EPDM polymers that are amorphous and semi-crystalline, respectively. See also FIGS. 1-4.

TABLE 2

| Ex. | MV (ML1 + 4, 125° C.) | 13C MR Composition* | | |
|---|---|---|---|---|
| | | Type | wt % C2 | wt % Octene | wt % ENB |
| EODM 1 | 21.5 | Octene | 56.90 | 37.60 | 5.40 |
| EODM 2 | 46.7 | Octene | 60.50 | 34.80 | 4.70 |
| EODM 3 | 104.3 | Octene | 62.50 | 33.60 | 3.80 |
| EODM 4 | 20.0 | Octene | 44.30 | 51.60 | 4.10 |
| EODM 5 | 41.0 | Octene | 44.00 | 51.70 | 4.30 |
| EODM 6 | 101.4 | Octene | 45.50 | 50.20 | 4.30 |

*Each wt % based on weight of terpolymer.

TABLE 3

| | V0.1 (Pa · s), 190° C. | V0.1/V100 190° C. | Tg (° C.) | Tc (° C.) | Tm (° C.) | XC wt % | Mw (g/mole) | Mw/Mn | Density (g/cc) |
|---|---|---|---|---|---|---|---|---|---|
| EODM 1 | 28000 | 25 | −52.9 | 8.1 | 33.6 | 7.4 | 122,633 | 2.94 | Approx. 0.86 |
| EODM 2 | 65000 | 25 | −48.3 | 27.9 | 46.9 | 11.9 | 163,681 | 2.64 | Approx. 0.87 |
| EODM 3 | 140000 | 33.3 | −49.4 | 27.7 | 46.2 | 12.5 | 269,807 | 3.32 | Approx. 0.87 |
| EODM 4 | | | −60.4 | 0 | 0 | 0 | 246,158 | 2.79 | <0.855 amorphous |
| EODM 5 | 90000 | 57 | −58.5 | 0 | 0 | 0. | 419,595 | 2.92 | <0.855 amorphous |
| EODM 6 | 277000 | 146 | −58.7 | 0 | 0 | 0 | 586,077 | 4.93 | <0.855 amorphous |

TABLE 4

| Ex. | Tg (° C.) | Mw (g/mole) | | Eqn. 1.0 (° C.) | Eqn. 2.1 (g/mole) | Eqn. 2.2 (g/mole) | Eqn. 2.3 (g/mole) | Eqn. 2.4 (g/mole) | Eqn. 2.5 (g/mole) |
|---|---|---|---|---|---|---|---|---|---|
| EODM 1 | −52.9 | 122633 | / | −50.4 | 115384 | 152445 | 192445 | 214945 | 237445 |
| EODM 2 | −48.3 | 163681 | / | −47.6 | 115384 | 152445 | 192445 | 214945 | 237445 |
| EODM 3 | −49.4 | 269807 | / | −47.2 | 124496 | 161557 | 201557 | 224057 | 246557 |
| EODM 4 | −60.4 | 246158 | / | −55 | 87939 | 125000 | 165000 | 187500 | 210000 |
| EODM 5 | −58.5 | 419595 | / | −55 | 150514 | 187575 | 227575 | 250075 | 272575 |
| EODM 6 | −58.7 | 586077 | / | −55 | 248218 | 285279 | 325279 | 347779 | 370279 |

Eq. 1.0 Tg(° C.) ≤ 0.625(° C./wt %)XC − 55° C. Eq. 2.1 Mw (g/mol) ≥ 1097.8[(g/mol)/MV] * MV + 87939(g/mol). Eq. 2.2 Mw (g/mol) ≥ 1097.8[(g/mol)/MV] * MV + 125000(g/mol). Eq. 2.3 Mw (g/mol) ≥ 1097.8[(g/mol)/MV] * MV + 165000(g/mol). Eq. 2.4 Mw (g/mol) ≥ 1097.8[(g/mol)/MV] * MV + 187500(g/mol). Eq. 2.5 Mw (g/mol) ≥ 1097.8[(g/mol)/MV] * MV + 210000(g/mol).

TABLE 5

Dynamic Response of EODM and EPDM polymers

| Ex. | Frequency (rad/s) | E' (Pa) | E'500/E'0.5 |
|---|---|---|---|
| NORDEL 4570 | 0.5 | 2017591 | |
| | 500 | 3296483 | 1.63 |
| EODM 5 | 0.5 | 709042 | |
| | 500 | 663630 | 0.94 |
| EODM 6 | 0.5 | 1007770 | |
| | 500 | 1270258 | 1.26 |

TABLE 6

| Ex. | Mooney Viscosity (ML1 + 4, 125° C.) | % C2 | % ENB | Mw (g/mol) | Tg (° C.) | Crystallinity XC (wt %) |
|---|---|---|---|---|---|---|
| NORDEL IP 3640 | 40 | 55.2 | 1.50 | 145,620 | −50.9 | 4.8 |
| NORDEL IP 3670 | 70 | 58.1 | 1.72 | 183,130 | −50.2 | 5.9 |
| NORDEL IP 4520 | 20 | 56.1 | 2.29 | 167,770 | −50.2 | 5.8 |
| NORDEL IP 4570 | 70 | 50.2 | 4.75 | 181,940 | −48.0 | 1.0 |
| NORDEL IP 4640 | 40 | 54.9 | 3.74 | 136,090 | −48.2 | 2.8 |
| NORDEL IP 5565 | 65 | 49.2 | 6.43 | 180,240 | −45.5 | 0.2 |

TABLE 7

| Example | Mooney Viscosity (ML1 + 4, 125° C.) | % C2 | % ENB | Mw (g/mol) | Tg (° C.) | % Crystallinity XC |
|---|---|---|---|---|---|---|
| NORDEL IP 3720 | 20 | 70.2 | 0.56 | 114,810 | −44.2 | 14.5 |
| NORDEL IP 3722 | 18 | 70.6 | 0.82 | 96,310 | −43.2 | 16.3 |
| NORDEL IP 3745 | 45 | 70.3 | 0.42 | 142,710 | −44.1 | 14.2 |
| NORDEL IP 4725 | 25 | 70.9 | 4.78 | 121,640 | −38.0 | 12.9 |
| NORDEL IP 4760 | 60 | 67.6 | 4.95 | 148,380 | −43.6 | 14.6 |
| NORDEL IP 4770 | 70 | 70.7 | 4.83 | 180,590 | −37.2 | 13.2 |
| NORDEL IP 3760 | 60 | 66.0 | 2.12 | 171,580 | −45.4 | 9.2 |

Figure 2:
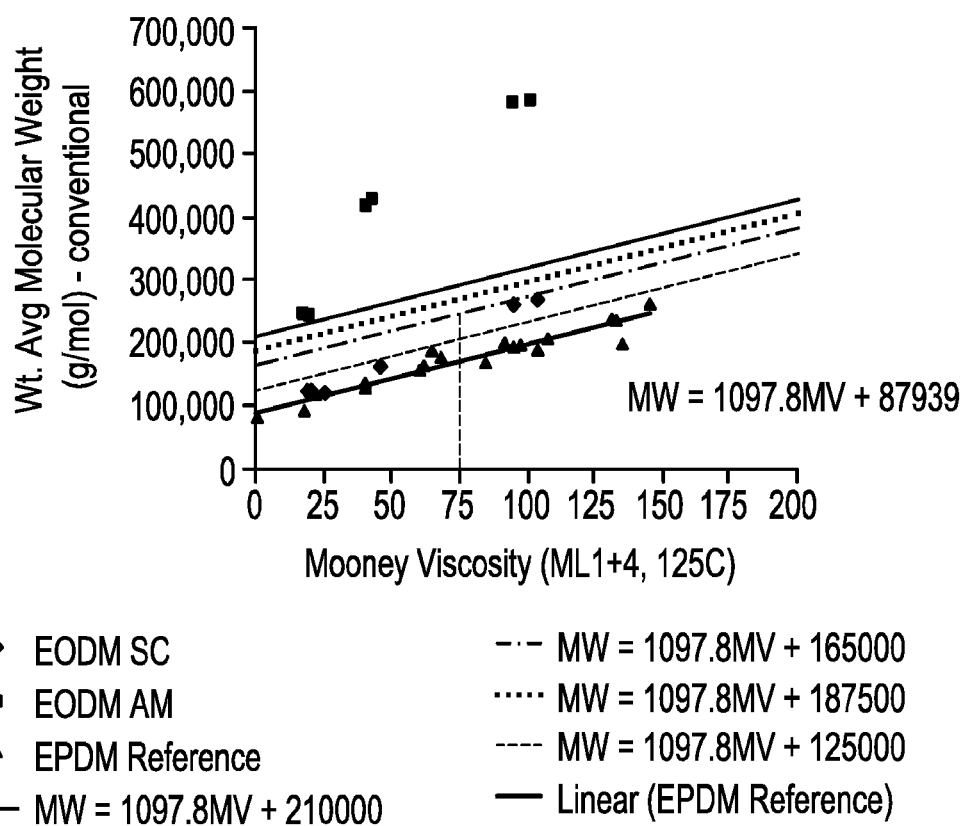
FIG. 2 is a plot of "Mw" versus "MV(1+4, 125° C.)" for several inventive EODMs and comparative EPDMs.

It has been discovered that the EODM polymers (first compositions) have significantly lower Tg, glass transition temperatures than the conventional NORDEL EPDM polymers. This is evident in FIG. 1 that shows amorphous and semi-crystalline EODM polymers have lower Tg for its crystallinity than their EPDM counterparts. In particular, it has been discovered that the amorphous EODM examples have zero or no observable crystallinity, and the glass transition temperatures are more than 10° C. lower than NORDEL 4570 and NORDEL 4520 that contain about 50-57 weight percent of ethylene. This is believed due to the effectiveness of both the octene and ENB comonomers to disrupt the crystallization of the polymers, and that high octene containing examples are less densely packed, to result in greater mobility and lower Tg. This is expected to have benefits for the low temperature properties of cross-linked compounds which require subambient compression set and flexibility. Surprising, it was discovered that the EODM examples have higher molecular weight than EPDM polymers. FIG. 2 compares the weight average molecular weight of both amorphous and semi-crystalline EODM examples to EPDM polymers as a function of its Mooney viscosity. It has been discovered that the amorphous EODM polymers have significantly higher molecular weight, almost 2-3 times that of a comparable EPDM. The effect is most prominent at high levels of octene comonomer, greater than 40% octene. It has been discovered that the EODM polymers that contain high octene content have higher entanglement molecular weight.

Figure 3:
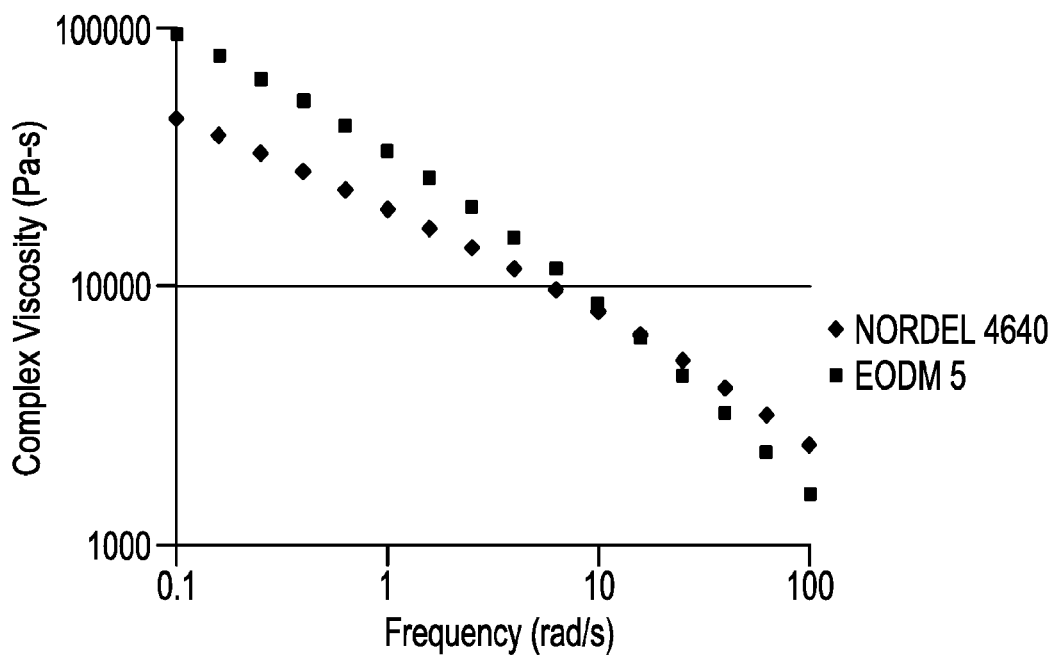
FIG. 3 depicts the Complex Shear Rheology of NORDEL 4640 and EODM 5.
Figure 4:
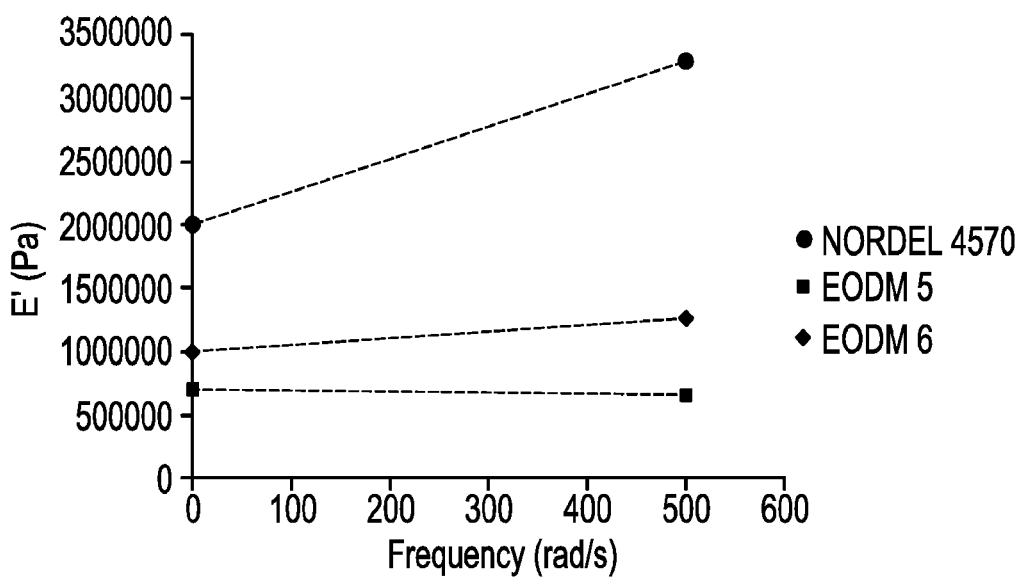
FIG. 4 depicts E'(Pa) versus frequency (rad/s) for EODM 5 and EODM 6 and NORDEL 4570.

To understand the effect of the higher entanglement molecular weight on how these examples were made, FIG. 3 compares the complex shear rheology of an amorphous EODM polymer and amorphous EPDM polymer that have similar Mooney viscosities (45 and 40, respectively). It is observed that the EODM polymer, has higher viscosity at low shear rate and shear thins more rapidly; suggesting that the EODM polymer was more shear sensitive, and its chains disentangled more easily. During the production of these polymers, a particular in-reactor viscosity and resultant polymer Mooney viscosity was targeted, and the polymerization conditions were adjusted to reach it (less hydrogen, lower temperature, lower conversion), in order to raise the molecular weight of the polymer to reach the targeted Mooney viscosity. Therefore, the reactor conditions and viscosity targets used to produce an EODM polymer were vastly different than that for EPDM polymers, and provided a unique polymer by process invention. From the property and application standpoint, the high molecular weight and high shear sensitivity of these EODMs can have great benefits in applications that require good extrudability, high green strength, fast processing of high molecular weight polymers that may not be typically processable. For example, the inventive example having the "processability" of a "45 Mooney viscosity polymer," but the physical properties and formulation capabilities of a much higher molecular weight polymer (400,000 g/mol), to surpasses those of conventional EPDM polymers (only 135,000 g/mol for NORDEL 4640, 40 MV).

It has been discovered that the room temperature G' modulii of the EODMs are significantly lower than that of a comparable EPDM of similar crystallinity. For example, compare EODMs 4-6 with NORDEL 4570 and NORDEL 4520, and compare EODMs 1-3 with NORDEL 4725 and NORDEL 4770 Therefore, the inventive EODMs (first compositions) have the added benefit of being softer (i.e., lower Shore A values and lower static and dynamic moduli) and would result in formulated compounds that are also softer. For automotive applications, softer compounds would improve sealing properties and provide higher flexibility at its intended use-temperature. If a target Shore A is required, softer compounds can also re-formulated with less oil and more filler to result in tougher compounds (less diluent present). The combined properties of the invention, higher molecular weight, softer, and high processability are attractive features for both a material compounder and its end-use application/properties.

In particular, EPDM due to the high modulus of the ethylene-backbone result in compounds that have low 'building tack' due to the high modulus of the ethylene-backbone polymer; term used to describe the ability of a rubber to stick to itself in the uncured state, so allowing pre-building of the material before curing. Building tack is a property that is typically known for soft rubbers such as natural rubber, polyisoprene, polychloroprene, polybutadiene and is critical property in the assembly of tires and belts where layers of materials are pre-assembled and then subsequently cured. The soft amorphous EODM examples may have added benefits of increased building tack to allow the expanded use of ethylene-based polymers for the assembly of automotive belts and car tire and tube assembly.

B) Sulfur-Cured Thermoset Property Evaluation

Polymer mixing and properties were compared in accelerated sulfur vulcanized formulations shown in Table 8. Standard rubber compound—A standard "up-side down" mix was used, with CaCO3, carbon black, oil, stearic acid and EPDM added initially in a Banbury mixer at a rotor speed of 77 rpm. The ZnO and other curatives were added in the sweep (65° C.). The compound was dropped at 100° C. Mixing was completed on a 6" 2 roll mill at ambient conditions, a blanket was sheeted out to use for rheology and mechanical testing.

TABLE 8

Sulfur-Cure Formulations

| Formulation | FA | FB | FC | FD | F1 | F2 | F3 | F4 | F5 | F6 |
|---|---|---|---|---|---|---|---|---|---|---|
| NORDEL IP 4725 | 100 | | | | | | | | | |
| NORDEL IP 4770 | | 100 | | | | | | | | |
| NORDEL IP 4520 | | | 100 | | | | | | | |
| NORDEL IP 4570 | | | | 100 | | | | | | |
| EODM 1 | | | | | 100 | | | | | |
| EODM 2 | | | | | | 100 | | | | |
| EODM 3 | | | | | | | 100 | | | |
| EODM 4 | | | | | | | | 100 | | |
| EODM 5 | | | | | | | | | 100 | |
| EODM 6 | | | | | | | | | | 100 |
| KADOX 720 Zinc Oxide | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 |
| N-550 Carbon Black | 80 | 80 | 80 | 80 | 80 | 80 | 80 | 80 | 80 | 80 |
| SUNPAR 2280 | 50 | 50 | 50 | 50 | 50 | 50 | 50 | 50 | 50 | 50 |
| Butyl Zimate (ZDBC) | 2 | 2 | 2 | 2 | 2 | 2 | 2 | 2 | 2 | 2 |
| CAPTAX MBT | 1 | 1 | 1 | 1 | 1 | 1 | 1 | 1 | 1 | 1 |
| AKROCHEM TMTD | 0.5 | 0.5 | 0.5 | 0.5 | 0.5 | 0.5 | 0.5 | 0.5 | 0.5 | 0.5 |
| Sulfur | 1.5 | 1.5 | 1.5 | 1.5 | 1.5 | 1.5 | 1.5 | 1.5 | 1.5 | 1.5 |
| Total phr lab | 241.0 | 241.0 | 241.0 | 241.0 | 241.0 | 241.0 | 241.0 | 241.0 | 241.0 | 241.0 |

Table 9 and Table 10 summarize the cured properties of formulations containing EODM semi-crystalline and EODM amorphous first compositions, respectively. Formulations containing semi-crystalline EODM first compositions, in comparison to formulations containing semi-crystalline EPDM first compositions (NORDEL 4725 and NORDEL 4770), showed the following differences: Mooney viscosity of the "EODM formulations" are lower, and thus, potentially be easier to process and flow. Mooney scorch: EODM formulations showed similar scorch times to comparable EPDM formulations. MDR Torque (MH-ML): EODM formulations have lower MH-ML, indicating less torque or power is being used or the formulations are softer and easier to deform, even in the crosslinked state.

Heat aged and unaged tensile properties: Semi-crystalline EODM formulations have lower ultimate tensile properties (lower strain and lower stress at break). Shore A hardness: EODM formulations have lower Shore A hardness than EPDM; this may be due to differences in the crystallinity of the polymers but the examples show from 3 to 10 units lower for an equivalent Mooney viscosity EPDM. Green strength (Uncured tensile properties): EODM formulations show lower green strength than comparable EPDM formulations; another indication of its softer nature. Tear Properties @23° C.: EODM formulations show lower tear resistance, this may be due to the lower entanglement density of the polymer network. Compression Set 100° C. and 23° C.: EODM formulations show significantly lower compression set than comparable EPDM formulations; 4-7 units lower at 100° C., and 12-14 units lower at 23° C. This suggests that these EODM formulations would have better sealing and better temperature resistance in comparison to EPDM, Low Temperature Brittleness: EODM formulations showed higher failure percentages at −60° C. Amorphous EODM examples in comparison to semi-crystalline EPDM references (NORDEL 4520 and NORDEL 4570) showed the following differences: Mooney viscosity of EODM formulations are lower in viscosity; potentially be easier to process and flow. Mooney scorch: EODM formulations showed similar scorch times to comparable EPDM formulations. MDR Torque (MH-ML): Amorphous EODM formulations have lower MH-ML, indicating less torque or power is used, or the formulations are softer and easier to deform, even in the crosslinked state.

Heat aged and unaged tensile properties: In the absence of crystallinity, amorphous EODM formulations have lower tensile modulus and lower ultimate tensile properties (lower strain and lower stress at break). Shore A hardness: amorphous EODM formulations have lower Shore A hardness than EPDM with comparable ethylene content; and 10 units lower for an equivalent Mooney viscosity EPDM. This suggests that these formulations could be formulated to contain higher filler or less oil to result in cheaper but equivalent or better mechanical properties. Green strength (Uncured tensile properties): EODM formulations show lower green strength than comparable EPDM formulations; another indication of its softer nature. Tear Properties @23° C.: EODM formulations show lower tear resistance, this may be due to the lower entanglement density of the polymer network. Compression Set 100° C. and 23° C.: Amorphous EODM formulations shows higher compression set than comparable EPDM formulations at 100° C. (+7-10 units) and similar compression set at 23° C. (±4 units). Low Temperature Brittleness: EODM formulations can lower failure percentages at lower temperatures; e.g., 90 Mooney viscosity, amorphous EODM shows zero percent failure when compared to NORDEL 4570 at −60° C.

Summary of Results

New ethylene-octene-ENB terpolymers (EODM) have been prepared. Compared to EPDM polymers, the EODM polymers exhibit lower glass transition temperatures and lower modulus. However, they also exhibit a unique feature in that the molecular weight of the polymers for an equivalent Mooney viscosity are higher for semi-crystalline examples and significantly higher for amorphous examples.

This can be explained by the increase in entanglement molecular weight of the polymer that results in a polymer that is less entangled, more shear sensitive, and has lower modulus—similar to other natural and synthetic rubbers. This combination of higher molecular weight combined with the lower modulus of the polymer (due to a higher entanglement molecular weight) results in a polymer, and formulations containing the same, with lower modulus, better physical properties, and wider temperature use range; e.g. lower Shore A and improved compression set when compared to EPDM's. The inventive EODM polymers (first compositions) have many utility and benefits for thermoset applications. In particular, sulfur cured compounds can exhibit improvements in flowability and softness, as well as better mechanical/physical properties (tensile, tear, compression set, low temperature flexibility). Such polymers could provide the rubber industry with additional degrees of freedom to meet their compound and application requirements (e.g. high temperature resistance, low temperature performance, mixing and processing, increased melt strength due to higher low shear viscosity etc.) Applications may include; better sealing automotive weather strips, especially at low temperatures, compounds that have higher building tack for the assembly of belts, higher temperature resistance and increased flexibility for hoses, and better dynamic properties for use in tire assembly.

TABLE 9

Properties of sulfur Cured Compounds - Semi-crystalline EODM

| Formulation | | FA | FB | F1 | F2 | F3 |
|---|---|---|---|---|---|---|
| ML(1 + 4, 100° C.) | [MU] | 28.8 | 66.5 | 23.1 | 42.6 | 72.5 |
| New Mooney Scorch to t10 | 125° C. | ASTM D1646 | | | | |
| t3 | [M · m] | 10.1 | 7.2 | 10 | 8.7 | 7.6 |
| t5 | [M · m] | 11.3 | 7.9 | 11.3 | 9.8 | 8.5 |
| t10 | [M · m] | 12.8 | 9.3 | 12.8 | 11.4 | 9.7 |
| MDR | Norm | ASTM D5289 | | | | |
| ML | [dNm] | 0.76 | 1.7 | 0.53 | 1.03 | 2.07 |
| MH | [dNm] | 19.6 | 21.69 | 14.72 | 17.64 | 16.16 |
| MH − ML | [dNm] | 18.84 | 19.99 | 14.19 | 16.61 | 14.09 |
| t10 | [min] | 1.57 | 1.24 | 1.54 | 1.37 | 1.23 |
| t50 | [min] | 4.14 | 2.76 | 4.15 | 3.56 | 3.01 |
| t90 | [min] | 13.58 | 13.34 | 12.63 | 14.29 | 14.44 |
| t95 | [min] | 17.71 | 18.45 | 16.53 | 18.41 | 19.71 |
| Tand@final | | 0.065 | 0.076 | 0.033 | 0.041 | 0.149 |
| Tensile Test | | ASTM D412 | HEAT AGING ASTM D573/70.0 hour/125° C. | | | |
| 100% Mod M | [MPa] | 5.1 | 5.5 | 4.5 | 5.0 | 5.1 |
| Stress@BK | [MPa] | 15.0 | 17.7 | 9.9 | 11.6 | 14.2 |
| Strain@BK | [%] | 328 | 344 | 219 | 247 | 312 |
| Stress@Yield | [MPa] | 15.0 | 17.7 | 9.9 | 11.6 | 14.2 |
| Strain@Yield | [%] | 328 | 344 | 219 | 247 | 312 |
| Tensile Test | | ASTM D412 | Unaged, Room Temperature | | | |
| 100% Mod M | [MPa] | 3.7 | 4.1 | 3.0 | 3.6 | 3.8 |
| Stress@BK | [MPa] | 15.7 | 17.8 | 9.7 | 11.5 | 14.1 |
| Strain@BK | [%] | 543 | 504 | 375 | 401 | 463 |
| Stress@Yield | [MPa] | 15.7 | 17.8 | 9.7 | 11.5 | 14.1 |
| Strain@Yield | [%] | 543 | 504 | 375 | 401 | 463 |
| Shore A Hard | | 75 | 77 | 65 | 72 | 74 |
| Tensile Uncured | | ASTM D412 | Unaged, Room Temperature | | | |
| 100% Mod M | [MPa] | 1.7 | 2.3 | 0.7 | 1.7 | 2.0 |
| Ten@Brk | [MPa] | 7.6 | 12.8 | 1.0 | 7.8 | 9.1 |
| % Elg@UT | [%] | 1171 | 918 | 460 | 1194 | 872 |
| Ten@Yield | [MPa] | 8 | 13 | 1 | 8 | 9 |
| % Elg@Yield | [%] | 1168 | 918 | 460 | 1194 | 872 |
| Test_Temp | [C.] | 23 | 23 | 23 | 23 | 23 |
| | | Tear test-Type C | | | | |
| Tear Strength M | [N/mm] | 46.6 | 50.3 | 30.2 | 37.1 | 35.1 |
| Compression set | | 100C, 22 hrs | | | | |
| CS Mean | [%] 100 C., 22 hrs | 36 | 28 | 29 | 26 | 24 |

TABLE 9-continued

| Properties of sulfur Cured Compounds - Semi-crystalline EODM | | | | | | |
|---|---|---|---|---|---|---|
| CS Mean | [%], 23 C., 22 hrs | 31 | 34 | 17 | 23 | 22 |
| Low Temperature Brittleness | | | | | | |
| −45° C. | % Failure | | | | 0 | |
| −50° C. | % Failure | | | | 20 | |
| −55° C. | % Failure | | | 0 | 20 | 0 |
| −60° C. | % Failure | 0 | 0 | 100 | 40 | 40 |

TABLE 10

| Properties of sulfur Cured Compounds - Amorphous EODM | | | | | | |
|---|---|---|---|---|---|---|
| Formulation | | FC | FD | F4 | F5 | F6 |
| ML(1 + 4, 100° C.) | [MU] | 29 | 71.4 | 20.4 | 30.7 | 44.9 |
| New Mooney Scorch to t10 | | 125C | ASTM D1646 | | | |
| t3 | [M · m] | 8.6 | 7.2 | 9 | 7.4 | 7.6 |
| t5 | [M · m] | 9.9 | 8 | 10 | 8.2 | 8.4 |
| t10 | [M · m] | 11.6 | 9.3 | 11.1 | 9.2 | 9.4 |
| MDR | | Norm | ASTM D5289 | | | |
| Test temp. | [C.] | 160 | 160 | 160 | 160 | 160 |
| ML | [dNm] | 0.68 | 1.76 | 0.64 | 1.06 | 1.59 |
| MH | [dNm] | 19.62 | 20.83 | 10.9 | 10.59 | 11.92 |
| MH − ML | [dNm] | 18.94 | 19.07 | 10.26 | 9.53 | 10.33 |
| t10 | [min] | 1.42 | 1.25 | 1.4 | 1.18 | 1.25 |
| t50 | [min] | 3.89 | 3 | 3.48 | 3.26 | 3.42 |
| t90 | [min] | 13.69 | 16.42 | 13.85 | 13.72 | 13.65 |
| t95 | [min] | 18.01 | 21 | 18.15 | 18.06 | 17.98 |
| Tand@fmal | | 0.042 | 0.097 | 0.047 | 0.047 | 0.033 |
| Tensile Test | | ASTM D412 | HEAT AGING ASTM D573/70.0 hour/125° C. | | | |
| 100% Mod M | [MPa] | 4.4 | 4.5 | 3.3 | 3.8 | 4.2 |
| Stress@BK | [MPa] | 10.4 | 10.7 | 5.3 | 6.3 | 7.6 |
| Strain@BK | [%] | 245 | 241 | 152 | 156 | 167 |
| Stress@Yield | [MPa] | 10.4 | 10.7 | 5.3 | 6.3 | 7.6 |
| Strain@Yield | [%] | 245 | 241 | 152 | 156 | 167 |
| Tensile Test | | ASTM D412 | Unaged, Room Temperature | | | |
| 100% Mod M | [MPa] | 2.9 | 3.2 | 2.1 | 2.3 | 2.5 |
| Stress@BK | [MPa] | 10.2 | 11.5 | 5.1 | 6.2 | 7.6 |
| Strain@BK | [%] | 412 | 398 | 245 | 268 | 287 |
| Stress@Yield | [MPa] | 10.2 | 11.5 | 5.1 | 6.2 | 7.6 |
| Strain@Yield | [%] | 412 | 398 | 245 | 268 | 287 |
| ShoreAHard | | 65 | 66 | 57 | 57 | 57 |
| Tensile Uncured | | ASTM D412 | Unaged, Room Temperature | | | |
| 100% Mod M | [MPa] | 0.21 | 0.39 | 0.13 | 0.17 | 0.30 |
| Ten@Brk | [MPa] | 0.28 | 0.47 | 0.16 | 0.19 | 0.30 |
| % Elg@UT | [%] | 45 | 48 | 67 | 73 | 78 |
| Ten@Yield | [MPa] | 0.28 | 0.47 | 0.15 | 0.19 | 0.3 |
| % Elg@Yield | [%] | 43 | 49 | 68 | 74 | 78 |
| Tear test-Type C | | 23C | | | | |
| Tear Strength M | [N/mm] | 32.5 | 32.2 | 17.5 | 17.7 | 18.9 |
| Compression set | | 100C, 22 hrs | | | | |
| CS Mean | [%] 100 C., 22 hrs | 27 | 20 | 34 | 31 | 30 |

TABLE 10-continued

| Properties of sulfur Cured Compounds - Amorphous EODM | | | | | | |
|---|---|---|---|---|---|---|
| CS Mean | [%], 23 C., 22 hrs | 10 | 8 | 14 | 12 | 8 |
| Low Temperature Brittleness | | | | | | |
| −45 C. | % Failure | | | | | |
| −50 C. | % Failure | | | | | |
| −55 C. | % Failure | 0 | 0 | 0 | 0 | |
| −60 C. | % Failure | 40 | 20 | 60 | 100 | 0 |

C) Heat Aging Resistance and Low Temperature Percent Recovery After Compression

The inventive and comparative polymers are mixed and prepared according to the methods described above and the formulation recipes shown in Table 11. The rubber compounds are prepared and cured according to the methods described above.

The cured specimens containing the inventive EODM polymers have better heat aging resistance than the comparative EPDM that were formulated with the same components except for the polymer. The inventive examples and comparative EPDM specimens are exposed to 180° C. for 96 hrs. Table 12 shows that the EODM samples have a higher percent retention of its tensile elongation to break than the comparative EPDM (NORDEL 4725 and NORDEL 4760). In particular, after 48 hours of hot air aging, all of the EODM examples have a retention percent of tensile elongation to break of greater than 34%. The comparative EPDM examples have a retention percent of the tensile elongation to break of less than 24%.

The cured specimens containing the inventive EODM polymers have better low temperature recovery than the comparative EPDM that were formulated with the same components except for the polymer. Table 12 shows the percent recovery after compression of the specimens at −25° C. and −35° C. At −25° C. the recovery % after compression is higher for the EODM examples than the comparative EPDM (NORDEL 4725 and NORDEL 4760). At −35° C., EODM 1, EODM 4, and EODM 5 have a percent recovery after compression above 59%. The comparative EPDM tested under similar conditions have a percent recovery after compression below 58%. Uniquely, EODM 4 has the highest percent recovery after compression of 70.2%. The excellent percent recovery after compression may be attributed to the low glass transition temperature and amorphous nature of the inventive polymer used in this example.

From the application perspective, the combination of high heat aging resistance and low temperature elasticity is a distinct advantage of the inventive EODM polymers. Rubber compounds containing EODM would retain more of its properties after heat aging and retain high elasticity and low compression set at lower temperatures. This would be advantaged for weather sealing profiles for automotive and infrastructure, and gaskets and hoses operated at freezing temperatures.

TABLE 11

| Peroxide Cured Formulations | | | | | | |
|---|---|---|---|---|---|---|
| Formulation | FE | FF | F7 | F8 | F9 | F10 |
| NORDEL IP 4725P | 100 | | | | | |
| NORDEL IP 4760P | | 100 | | | | |
| EODM 1 | | | 100 | | | |
| EODM 2 | | | | 100 | | |
| EODM 4 | | | | | 100 | |
| EODM 5 | | | | | | 100 |
| Newsil HD 165MP | 35 | 35 | 35 | 35 | 35 | 35 |
| Silquest A-172NT | 2 | 2 | 2 | 2 | 2 | 2 |
| ZnO | 10 | 10 | 10 | 10 | 10 | 10 |
| PEG 4000 | 2 | 2 | 2 | 2 | 2 | 2 |
| VULKANOX HS/LG | 1 | 1 | 1 | 1 | 1 | 1 |
| VULKANOX ZMB2 | 1 | 1 | 1 | 1 | 1 | 1 |
| Luperox 101-40 | 8 | 8 | 8 | 8 | 8 | 8 |
| Saret 517 | 1.5 | 1.5 | 1.5 | 1.5 | 1.5 | 1.5 |
| Total | 160.5 | 160.5 | 160.5 | 160.5 | 160.5 | 160.5 |

TABLE 12

| Properties of Peroxide Cured Formulations | | | | | | | |
|---|---|---|---|---|---|---|---|
| | | Formulation | | | | | |
| | | FE | FF | F7 | F8 | F9 | F10 |
| | | Example Polymer | | | | | |
| | Sample Aging at 180° C. | NORDEL 4725P | NORDEL 4760P | EODM 1 | EODM 2 | EODM 4 | EODM 5 |
| Tensile Elongation to Break Retention % | 0 h | 100% | 100% | 100% | 100% | 100% | 100% |
| | 24 h | 97% | 88% | 88% | 91% | 106% | 67% |
| | 48 h | 24% | 13% | 34% | 50% | 50% | 37% |
| | 72 h | 5% | 7% | 9% | 12% | 15% | 12% |
| | 96 h | 4% | 3% | 5% | 7% | 8% | 8% |
| % Recovery after Compression | −25° C. | 54.3 | 60.1 | 65.3 | 60.3 | 69.5 | 72.2 |
| | −35° C. | 33.6 | 57.6 | 59.3 | 48.7 | 70.2 | 59.2 |

What is claimed is:

1. A composition comprising an ethylene/C5-C10 alpha-olefin/non-conjugated polyene interpolymer, wherein the interpolymer meets the following relationship: $Tg\ (°C.) \leq [0.625(°C./wt\ \%)XC - 55°C.]$, where Tg is the glass transition temperature of the interpolymer, and XC is the wt % crystallinity of the interpolymer; and wherein the interpolymer meets the following relationship: $Mw\ (g/mol) > \{1097.8[(g/mol)/MV]*MV + 87939\ (g/mol)\}$, where Mw is the weight average molecular weight of the interpolymer, and MV is the Mooney Viscosity (ML1+4, 125° C.) of the interpolymer; and wherein the non-conjugated polyene of the interpolymer is 5-ethylidene-2-norbornene (ENB) or 5-vinyl-2-norbornene (VNB).

2. The composition of claim 1, wherein the ethylene/C5-C10 alpha-olefin/non-conjugated polyene interpolymer meets the following relationship: $Mw\ (g/mol) > \{1097.8[(g/mol)/MV]*MV + 125000(g/mol)\}$, where Mw is the weight average molecular weight of the interpolymer, and MV is the Mooney Viscosity (ML1+4, 125° C.) of the interpolymer.

3. The composition of claim 1, wherein the ethylene/C5-C10 alpha-olefin/non-conjugated polyene interpolymer meets the following relationship: $Mw\ (g/mol) > \{1097.8[(g/mol)/MV]*MV + 165000(g/mol)\}$, where Mw is the weight average molecular weight of the interpolymer, and MV is the Mooney Viscosity (ML1+4, 125° C.) of the interpolymer.

4. The composition of claim 1, wherein the ethylene/C5-C10 alpha-olefin/non-conjugated polyene interpolymer meets the following relationship: $Mw\ (g/mol) > \{1097.8[(g/mol)/MV]*MV + 187500(g/mol)\}$, where Mw is the weight average molecular weight of the interpolymer, and MV is the Mooney Viscosity (ML1+4, 125° C.) of the interpolymer.

5. The composition of claim 1, wherein the ethylene/C5-C10 alpha-olefin/non-conjugated polyene interpolymer meets the following relationship: $Mw\ (g/mol) > \{1097.8[(g/mol)/MV]*MV + 210000(g/mol)\}$, where Mw is the weight average molecular weight of the interpolymer, and MV is the Mooney Viscosity (ML1+4, 125° C.) of the interpolymer.

6. The composition of claim 1, wherein the ethylene/C5-C10 alpha-olefin/non-conjugated polyene interpolymer comprises from 30 to 60 wt % polymerized octene, based on the weight of the interpolymer.

7. The composition of claim 1, wherein the C5-C10 alpha-olefin of the ethylene/C5-C10 alpha-olefin/non-conjugated polyene interpolymer is a C6, C7 or C8 alpha-olefin.

8. The composition of claim 1, wherein the composition further comprises a second an ethylene/C5-C10 alpha-olefin/non-conjugated polyene interpolymer, which differs from the interpolymer in one or more of the following properties: Mw, Mn, MWD, Tg, and/or Mooney Viscosity (ML1+4, 125° C.).

9. The composition of claim 1, wherein the ethylene/C5-C10 alpha-olefin/non-conjugated polyene interpolymer has a Mw from 100,000 g/mole to 600,000 g/mole.

10. The composition of claim 1, wherein the ethylene/C5-C10 alpha-olefin/non-conjugated polyene interpolymer has a viscosity at 0.1 rad/sec, 190° C., greater than, or equal to, 15,000 Pa·s.

11. The composition of claim 1, wherein the ethylene/alpha-olefin/nonconjugated polyene interpolymer has a $MWD \leq 5.0$.

12. The composition of claim 1, wherein the composition comprises $\geq 90$ wt % of the ethylene/C5-C10 alpha-olefin/nonconjugated polyene interpolymer, based on the weight of the composition.

13. A composition comprising a first composition that comprises a first ethylene/C5-C10 alpha-olefin/non-conjugated polyene interpolymer, and a second ethylene/C5-C10 alpha-olefin/non-conjugated polyene interpolymer; and wherein the first composition meets the following relationship: $Tg_{FC}\ (°C.) \leq 0.625(°C./wt\ \%)XC_{FC} - 55°C.$, where $Tg_{FC}$ is the glass transition temperature of the first composition, and $XC_{FC}$ is the wt % crystallinity of the first composition;

wherein the first ethylene/C5-C10 alpha-olefin/non-conjugated polyene interpolymer meets the following relationship: $Mw\ (g/mol) > \{1097.8[(g/mol)/MV]*MV + 87939(g/mol)\}$, where Mw is the weight average molecular weight of the interpolymer, and MV is the Mooney Viscosity (ML1+4, 125° C.) of the interpolymer; and wherein the non-conjugated polyene of the first ethylene/C5-C10 alpha-olefin/non-conjugated polyene interpolymer is 5-ethylidene-2-norbornene (ENB) or 5-vinyl-2-norbornene (VNB).

14. The composition of claim 1, wherein the composition further comprises a crosslinking agent.

15. A crosslinked composition formed from the composition of claim 1.

16. An article comprising at least one component formed from the composition of claim 1.

17. The article of claim 16, wherein the article is selected from the group consisting of profiles, injection molded parts, gaskets, automotive parts, building and construction materials, shoe components, and tubes.

* * * * *